(12) United States Patent
Sugiura et al.

(10) Patent No.: US 10,639,836 B2
(45) Date of Patent: May 5, 2020

(54) INJECTION MOLDING MACHINE INCLUDING A TEMPERATURE CONTROL JACKET

(71) Applicant: FANUC CORPORATION, Yamanashi (JP)

(72) Inventors: Fuyuki Sugiura, Yamanashi (JP); Akira Oomori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 264 days.

(21) Appl. No.: 15/481,494

(22) Filed: Apr. 7, 2017

(65) Prior Publication Data

US 2017/0297244 A1   Oct. 19, 2017

(30) Foreign Application Priority Data

Apr. 14, 2016  (JP) .................................. 2016-081325

(51) Int. Cl.
| | | |
|---|---|---|
| *B29C 45/78* | (2006.01) | |
| *B29C 45/20* | (2006.01) | |
| *B29C 45/74* | (2006.01) | |

(52) U.S. Cl.
CPC .............. *B29C 45/78* (2013.01); *B29C 45/20* (2013.01); *B29C 45/74* (2013.01); *B29C 2945/7604* (2013.01); *B29C 2945/7619* (2013.01); *B29C 2945/7621* (2013.01); *B29C 2945/76381* (2013.01); *B29C 2945/76531* (2013.01);

(Continued)

(58) Field of Classification Search
CPC ......... B29C 45/78; B29C 45/20; B29C 45/74; B29C 2945/7604; B29C 2945/7619; B29C 2945/7621; B29C 2945/76381; B29C 2945/76531; B29C 2945/76668; B29C 2945/76688; B29C 2945/76859

See application file for complete search history.

(56) References Cited

FOREIGN PATENT DOCUMENTS

| CN | 102518635 A | * | 6/2012 |
|---|---|---|---|
| CN | 102518635 A | | 6/2012 |

(Continued)

OTHER PUBLICATIONS

"Angle Bracket", ToolCo, Sep. 1, 2006, accessed at tool.com at Feb. 11, 2019 (Year: 2006).*

(Continued)

*Primary Examiner* — Joseph S Del Sole
*Assistant Examiner* — Jamel M Nelson
(74) *Attorney, Agent, or Firm* — Hauptman Ham, LLP

(57) ABSTRACT

A joining member configured to join a temperature-controlled member and a temperature control jacket includes a temperature control jacket attachment part attached to the temperature control jacket, and a temperature-controlled member attachment part attached to the temperature-controlled member. The temperature control jacket attachment part includes a temperature control jacket-side opening into which a first bolt is insertable, and the temperature-controlled member attachment part includes a temperature-controlled member-side opening into which a second bolt is insertable. The temperature control jacket-side opening and/or the temperature-controlled member-side opening are configured to allow change in positions where the first and second bolts are inserted.

5 Claims, 4 Drawing Sheets

(52) U.S. Cl.
CPC .............. *B29C 2945/76668* (2013.01); *B29C 2945/76688* (2013.01); *B29C 2945/76859* (2013.01)

(56) References Cited

FOREIGN PATENT DOCUMENTS

| | | | |
|---|---|---|---|
| CN | 203531186 U | | 4/2014 |
| CN | 104441519 A | * | 3/2015 |
| CN | 204801520 U | * | 11/2015 |
| CN | 204801520 U | | 11/2015 |
| JP | 3008951 U | | 3/1995 |
| JP | 2015054508 A | | 3/2015 |

OTHER PUBLICATIONS

"Angle Brakcet", The Free Dictionary, Jan. 9, 2014 accessed at thefreedictionary.com on Feb. 11, 2019 (Year: 2014).*

Office Action in JP Application No. 2016-081325, dated Jun. 5, 2018, 6pp.

Office Action in CN Application No. 201710240563.1, dated Jan. 30, 2019, 15pp.

* cited by examiner

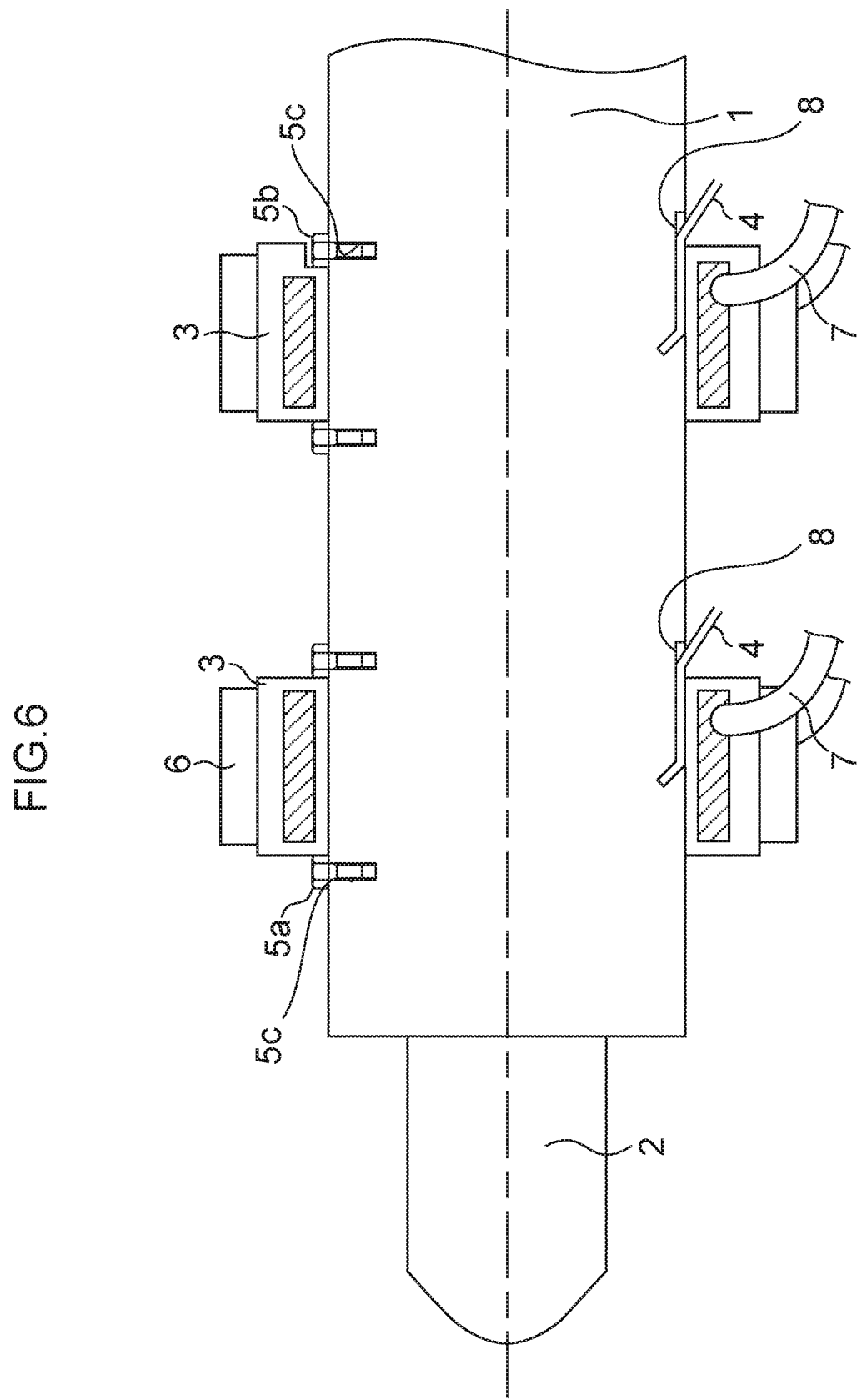

INJECTION MOLDING MACHINE INCLUDING A TEMPERATURE CONTROL JACKET

RELATED APPLICATIONS

The present application claims priority to Japanese Patent Application Number 2016-081325, filed Apr. 14, 2016, the disclosure of which is hereby incorporated by reference herein in its entirety.

BACKGROUND OF THE INVENTION

1. Field of the Invention

The present invention relates to an injection molding machine including a temperature control jacket.

2. Description of the Related Art

In an injection molding machine, temperature control of a molding material is carried out with the use of a fluid such as water, oil, or air, in some cases. For example, water or oil is used for temperature control in molding of a thermosetting resin in many instances.

FIG. 6 shows an example of an injection molding machine including a temperature control jacket according to the conventional art as described in Japanese Patent Application Laid-Open. No. 2015-054508.

A barrel 1 is equipped with a nozzle 2 at a tip thereof. Also, a plurality of ring shaped temperature control jackets 3 are mounted onto a peripheral part (peripheral surface) of the barrel 1 along an axis, in order to control a temperature of a molding material within the barrel 1. Each of flow channels of the temperature control jackets 3, which is shown as a shaded area, is filled with a fluid such as water, oil, or air, and a temperature or a flow rate of such a fluid is controlled for carrying out temperature control.

Generally, a temperature sensor 4 for carrying out temperature control is placed within or near each of temperature control areas of the barrel 1. According to the conventional arts shown in FIG. 6, grooves 8 are formed in a peripheral surface of the barrel 1, and the temperature sensor 4 is placed in each of the grooves 8, in other words, in a clearance left between the barrel 1 and each of the temperature control jackets 3.

The temperature control jackets 3 are fixed to the barrel 1. FIG. 6 shows a way of fixing the temperature control jackets 3 to the barrel 1. The temperature control jackets 3 are restrained from moving along an axis, and in a rotation direction of, the barrel 1, by bolts 5a and 5b which are screwed into and engaged with the bolt taps 5c provided in a periphery of the barrel 1, so that the temperature control jackets 3 are fixed to the barrel 1. The bolts 5a which restrain the temperature control jacket 3 from moving along an axis of the barrel 1 are placed at opposite ends of the temperature control jacket 3, and restrain the temperature control jacket 3 from moving along an axis of the barrel 1. The bolt 5b which restrains the temperature control jacket 3 from revolving about an axis (denoted by a dashed line in FIG. 6) of the barrel 1 is engaged with a recess formed in a part of the temperature control jacket 3, and restrains the temperature control jacket 3 from revolving about an axis of the barrel 1.

According to the conventional arts illustratively shown in FIG. 6, a position of the temperature control jacket 3 can be briefly settled. However, in this structure, a temperature control jacket can be placed only in a position where a bolt tap is provided, which causes a problem of incapability of changing a position of the temperature control jacket 3 along an axis of a barrel or a revolving position (phase) where the temperature control jacket 3 revolves about an axis of a barrel. This problem can become serious in performing an operation of attaching the temperature control jacket 3 to the barrel 1 newly or for maintenance, an operation of replacing a bolt, an operation of finely adjusting a position of the temperature control jacket 3 on a barrel, or the like operation. Also, in replacing the temperature control jacket 3, the temperature control jacket 3 which has the same size including a length thereof along an axis of the barrel 1 and a position of a recess which is engaged with a bolt along a circumference of a barrel, should be required.

As described above, a temperature sensor is provided in a barrel. Then, a position of a temperature control jacket should be appropriately determined under various conditions in accordance with a position where a temperature sensor fixed to a barrel is placed. This is because otherwise precise temperature control of a molding material could not be achieved. Also, even if a temperature sensor and a temperature control jacket are fixed to a barrel once, there arises a need to adjust again respective positions of a temperature sensor and a temperature control jacket for precisely controlling a temperature of a molding material. For example, when a temperature is set so as to increase from a base end side of a barrel toward a leading end side of a nozzle, each temperature control jacket is individually controlled in order to secure such a temperature gradient. Nonetheless, in a case where a required temperature gradient cannot be secured only by such individual control of each temperature control jacket, there may probably arise a need to cope by fine adjustment of a position where each temperature control jacket is attached.

The foregoing problem may probably be caused not only in a case where the temperature sensor 4 is provided in the groove 8 according to the conventional arts shown in FIG. 6 and the temperature control jacket 3 is placed on the temperature sensor 4, but also in a case where a temperature sensor is provided while being spaced from a temperature control jacket not shown in the drawings.

Provision of a plurality of bolt taps in a barrel, which allows change in a position of a temperature control jacket on one hand, increases a manufacturing cost on the other hand. Also, a strength of a barrel is reduced in proportion to such provision of a plurality of bolt taps. Further, such provision of a plurality of bolt taps in a barrel complicates a temperature distribution in a barrel, which may possibly cause a failure in precise temperature control.

SUMMARY OF THE INVENTION

Then, in view of the above-described problems associated with the conventional arts, it is an object of the present invention to provide an injection molding machine which allows change in a position and a phase of a temperature control jacket while having a simple structure being advantageous in terms of a manufacturing cost. It is also an object of the present invention to provide an injection molding machine which allows alignment with a temperature sensor, to thereby achieve more precise temperature control of a molding material. It is further an object of the present invention to provide an injection molding machine which is adaptable also to temperature control jackets which are different in size.

An injection molding machine according to the present invention includes: a temperature-controlled member; a temperature control jacket that includes a flow channel or a cooling element and is removably placed on a peripheral part of the temperature-controlled member; and a joining member configured to join the temperature-controlled member and the temperature control jacket. Then, the joining member includes: a temperature control jacket attachment part attached to the temperature control jacket; and a temperature-controlled member attachment part attached to the temperature-controlled member. The temperature control jacket attachment part includes a temperature control jacket-side opening into which a fixing member is insertable in order to join the joining member and the temperature control jacket. Also, the temperature-controlled member attachment part includes a temperature-controlled member-side opening into which the fixing member is insertable in order to join the joining member and the temperature-controlled member. Further, at least one of the temperature control jacket-side opening and the temperature-controlled member side opening is configured to allow change in a position where the fixing member is inserted in the opening.

The injection molding machine may include a temperature sensor in the temperature-controlled member, wherein positions of the temperature control jacket and the temperature sensor are changeable by change in a position where the fixing member is inserted in at least one of the temperature control jacket-side opening and the temperature-controlled member-side opening.

The temperature control jacket-side opening or the temperature-controlled member-side opening may be formed of at least one of a slot, a notch, and a round hole.

The joining member may be L-shaped.

The joining member may be block-shaped.

The temperature control jacket-side opening may be placed in a curved fashion so as to fit in with the peripheral part of the temperature-controlled member.

The injection molding machine according to the present invention with the above-described structure, allows change in a position and a phase of a temperature control jacket while having a simple structure being advantageous in terms of a manufacturing cost, allows alignment with the temperature sensor, to thereby achieve more precise temperature control of a molding material, and is adaptable also to temperature control jackets which are different in size.

BRIEF DESCRIPTION OF THE DRAWINGS

FIG. 6 is a view for explaining the conventional arts.

DETAILED DESCRIPTION OF THE PREFERRED EMBODIMENTS

An example of an injection molding machine including a temperature control jacket according to one embodiment of an injection molding machine of the present invention will be described with reference to FIG. 1.

Figure 1:
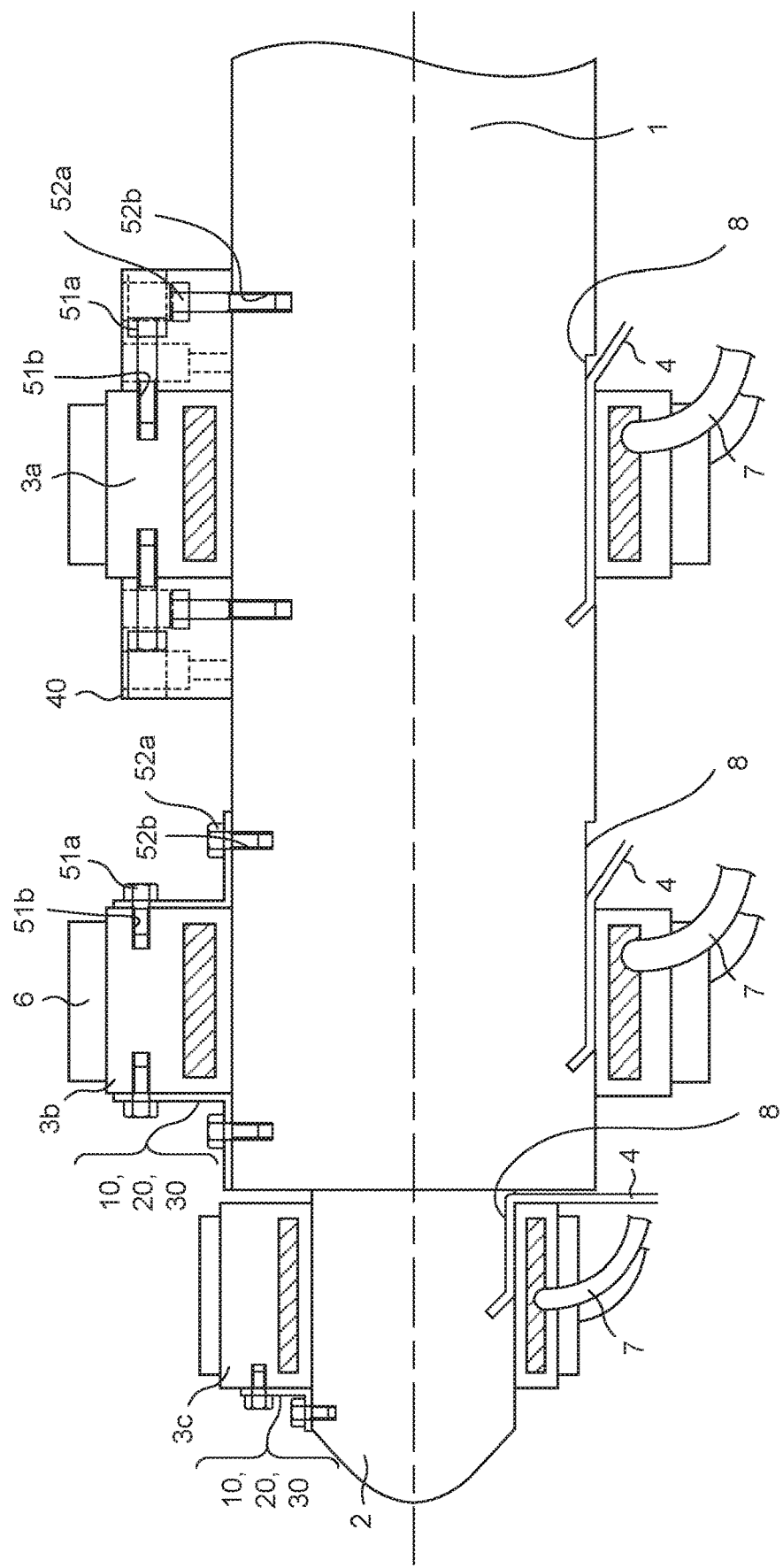
FIG. 1 is a segmentary view of an injection molding machine according to one embodiment of the present invention (a view showing a barrel and a nozzle)

As shown in FIG. 1, ring-shaped temperature control jackets 3a, 3b, and 3c are attached around the barrel 1 and the nozzle 2 with the use of joining members 10, 20, 30, and 40. Those joining members 10, 20, 30, and 40 are applicable to not only the temperature control jackets 3a and 3b which are attached to the barrel 1, but also the temperature control jacket 3c which is attached to the nozzle 2.

In the present specification, a temperature-controlled member includes the barrel 1 and the nozzle 2, and further includes a member which is temperature-controlled with a nozzle adapter (not shown) and the other temperature control jackets 3a, 3b, and 3c being attached thereto.

In FIG. 1, the first and second temperature control jackets 3a and 3b are removably attached to the barrel 1 at an outer periphery thereof, and the third temperature control jacket 3c is removably attached to the nozzle 2 at an outer periphery thereof. Shaded areas in FIG. 1 represent flow channels or cooling elements (not shown) of the temperature control jackets 3a, 3b, and 3c. The grooves 8 are formed in respective peripheries of the barrel 1 and the nozzle 2, and the temperature sensors 4 are placed in the grooves 8, respectively. Temperature control of the barrel 1 and the nozzle 2 is carried out based on information provided from the temperature sensors 4. A heater 6 which is used when heating is required in addition to temperature control carried out by the temperature control jackets 3a, 3b, and 3c, is wound around a peripheral part of each of the temperature control jackets 3a, 3b, and 3c. A reference symbol "7" in FIG. 1 denotes passages for injection/discharge of a fluid into/from the temperature control jackets 3a, 3b, and 3c, or lines for cooling elements.

The temperature control jackets 3a, 3b, and 3c are joined to the barrel 1 and the nozzle 2 by the joining members 10, 20, 30, and 40. The bolts 51a which are fixing members are screwed into and engaged with bolt taps 51b provided in the temperature control jackets 3a, 3b, and 3c, so that the joining members 10, 20, 30, and 40 are attached to the temperature control jackets 3a, 3b, and 3c. Further, bolts 52a which are fixing members are screwed into and engaged with bolt taps 52b provided in the barrel 1 and the nozzle 2, so that the joining member 10, 20, 30, and 40 are attached to the barrel 1 and the nozzle 2.

Parts of the joining members 10, 20, 30, and 40 which are attached to the temperature control jackets 3a, 3b, and 3c are temperature control jacket attachment parts 11, 21, 31, and 41, and also, parts of the joining members 10, 20, 30, and 40 which are attached to the barrel 1 and the nozzle 2 are temperature-controlled member attachment parts 12, 22, 32, and 42 (FIG. 2 to FIG. 5). As shown in FIG. 2 to FIG. 5, a lower side surface of each of the temperature-controlled member attachment parts 12, 22, 32, and 42 is curved along a peripheral surface of each of the barrel 1 and the nozzle 2.

Moreover, the joining members 10, 20, 30, and 40 which are attached to the barrel 1 are placed on a leading end side and a base end side with respect to an axis of the barrel 1 in each of the first and second temperature control jackets 3a and 3b. On the other hand, the joining members 10, 20, and 30 attached to the nozzle 2 may be placed only at one end side of the third temperature control jacket 3c in its axial direction.

Below, some examples of the joining members 10, 20, 30, and 40 will be described with reference to FIG. 2 to FIG. 5.

First, a first example of joining member (joining member 10) will be described with reference to FIG. 2.

The joining member 10 is L-shaped as a whole. One opening h is provided in the temperature control jacket attachment part 11 of the joining member 10. A temperature-controlled member-side opening 12a is provided in the temperature-controlled member attachment part 12 of the joining member 10. The bolts 51a and 52a which are fixing members are inserted into those openings h and 12a.

Since there is provided only one opening h in the temperature control jacket attachment part 11, change in positions of the temperature control jackets 3a, 3b, and 3c and the joining member 10 is not allowed. On the other hand, the temperature-controlled member-side opening 12a provided in the temperature-controlled member attachment part 12 is formed of a notch which has a predetermined length along an axis of each of the barrel 1 and the nozzle 2, so that positions of the barrel 1, the nozzle 2, and the joining member 10 can be changed along an axis.

By forming the temperature-controlled member-side opening 12a by a notch, it is possible to attach the bolt 52a (FIG. 1) at an arbitrary position within a range of the temperature-controlled member-side opening 12a (a range of a length of the notch). Also, with the bolt 52a being kept screwed into and engaged with the bolt tap 52b (FIG. 1), a position of the joining member 10 can be changed and the joining member 10 can be attached or detached.

Figure 2:
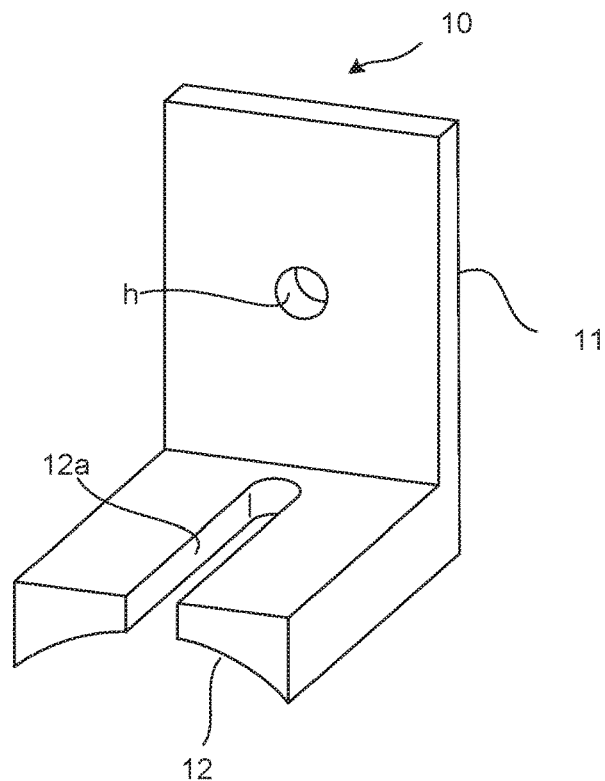
FIG. 2 is a perspective view of a joining member in the embodiment of the present invention.

It is noted that though the opening h of the temperature control jacket attachment part 11 is designed so as not to allow change in positions of the temperature control jackets 3a, 3b, and 3c and the joining member 10 in the joining member 10 shown in FIG. 2, the opening h may be provided so as to have a size enough to allow change in positions of the temperature control jackets 3a, 3b, and 3c and the joining member 10 within a limit allowing the bolt 51a to be tightened up.

Next, a second example of joining member (joining member 20) will be described with reference to FIG. 3. With, respect to parts of a structure which are similar to those in the above-described first example (joining member 10), description thereof may be omitted as appropriate.

A temperature control jacket-side opening 21a is provided in the temperature control jacket attachment part 21 of the joining member 20. A temperature-controlled member-side opening 22a is provided in the temperature-controlled member attachment part 22, of the joining member 20. Relative positions of the temperature control jackets 3a, 3b, and 3c with respect to the joining member 20, and relative positions of the barrel 1 and the nozzle 2 with respect to the joining member 20 can be changed.

Figure 3:
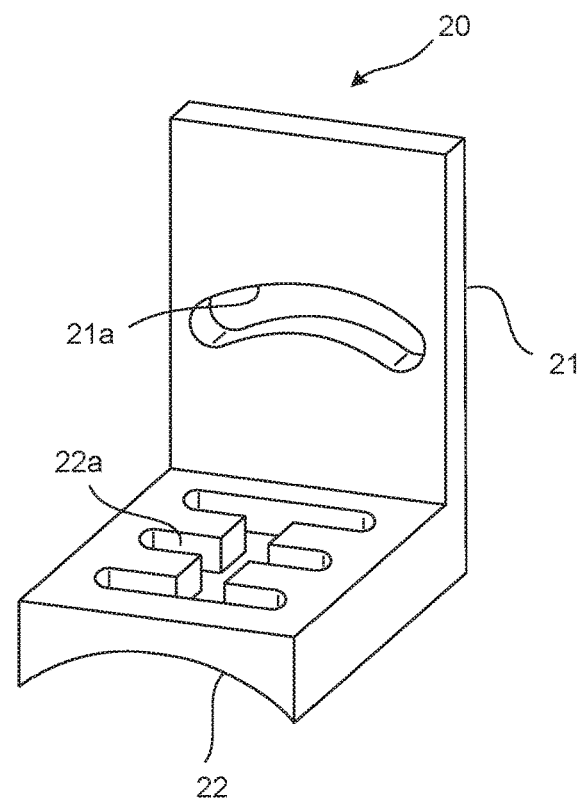
FIG. 3 is a perspective view of a joining member in another embodiment of the present invention.

The temperature control jacket-side opening 21a provided in the temperature control jacket attachment part 21 has a shape of a slot which is curved so as to fit in with a curved shape of a peripheral surface of each of the barrel 1 and the nozzle 2, as shown in FIG. 3. Accordingly, relative positions of the temperature control jackets 3a, 3b, and 3c with respect to the joining member 20 can be changed in a direction in which a peripheral surface of each of the barrel 1 and the nozzle 2 is curved.

On the other hand, the temperature-controlled member-side opening 22a provided in the temperature-controlled member attachment part 22 has a shape resulted from combining a slot which has a predetermined length along an axis of each of the barrel 1 and the nozzle 2, with three slots each of which has a predetermined length along a direction orthogonal to an axis of each of the barrel 1 and the nozzle 2 in plan view. Accordingly, relative positions of the barrel 1 and the nozzle 2 with respect to the joining member 10 can be changed along an axis and in a direction in which a peripheral surface of each of the barrel 1 and the nozzle 2 is curved.

As described above, by forming the joining member 20 so as to include the temperature control jacket-side opening 21a and the temperature-controlled member-side opening 22a, it is possible to attach the bolts 51a and 52a to arbitrary positions in respective ranges of the temperature control jacket-side opening 21a and the temperature-controlled member-side opening 22a. Also, with the bolts 51a and 52a being kept screwed into and engaged with the bolt taps 51b and 52b, relative positions of the barrel 1 and the nozzle 2 with respect to the joining member 20, and relative positions of the temperature control jackets 3a, 3b, and 3c with respect to the joining member 20 can be changed.

Next, a third example of joining member (joining member 30) will be described with reference to FIG. 4. With respect to parts in a structure which are similar to those in the above-described first and second examples (joining members 10 and 20), description thereof may be omitted as appropriate.

A temperature control jacket-side opening 31a is provided in the temperature control jacket attachment part 31 of the joining member 30. A temperature-controlled member-side opening 32a is provided in the temperature-controlled member attachment part 32, of the joining member 30. Relative positions of the temperature control jackets 3a, 3b, and 3c with respect to the joining member 30, and relative positions of the barrel 1 and the nozzle 2 with respect to the joining member 30 can be changed.

Figure 4:
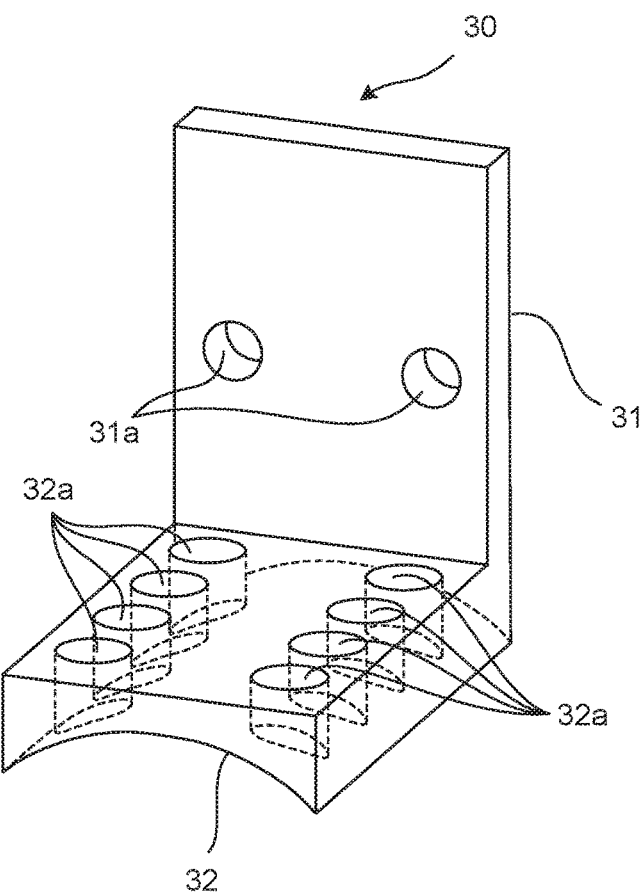
FIG. 4 is a perspective view of a joining member in another embodiment of the present invention.

The temperature control jacket-side opening 31a provided in the temperature control jacket attachment part 31 is formed of two round holes 31a which are aligned in a direction orthogonal to an axis of each of the barrel 1 and the nozzle 2 in plan view, as shown in FIG. 4. Accordingly, relative positions of the temperature control jackets 3a, 3b, and 3c with respect to the joining member 30 can be changed in a direction in which a peripheral surface of each of the barrel 1 and the nozzle 2 is curved.

On the other hand, in forming the temperature-controlled member-side opening 32a provided in the temperature-controlled member attachment part 32, four round holes are aligned (a round-hole row is formed to extend) along an axis of each of the barrel 1 and the nozzle 2, and two round-hole rows are put along a direction orthogonal to an axis each of the barrel 1 and the nozzle 2 in plan view. Accordingly, relative positions of the barrel 1 and the nozzle 2 with respect to the joining member 30 can be changed along an axis and in a direction in which a peripheral surface of each of the barrel land the nozzle 2 is curved.

It is noted that also each of the above-described round holes, as described above regarding the opening h in the first embodiment, may be provided so as to have a size enough to allow change in positions of the temperature control jackets 3a, 3b, and 3c and the joining member 30 within a limit allowing the bolt 51a or 52a to be tightened up. Further, the number of round holes forming a round-hole row and the number of round-hole rows is not limited to any number. In a case where three or more round holes are provided as the temperature control jacket-side opening 31a provided in the temperature control jacket attachment part 31, the round holes are placed in a curved fashion so as to fit in with a peripheral surface of each of the barrel 1 and the nozzle 2. Moreover, the temperature-controlled member-side opening 32a may be configured to extend radially in a direction of a normal of a curve of a peripheral surface of each of the barrel 1 and the nozzle 2.

Next, a fourth example of joining member (joining member 40) will be described with reference to FIG. 5. With respect to parts of a structure which are similar to those in the above-described first, second, and third examples (joining members 10, 20, and 30), description thereof may be omitted as appropriate.

The joining member 40 is box-shaped. Being box-shaped is more advantageous in stability than being L-shaped shown in the above described first, second, and third examples (joining members 10, 20, and 30). A temperature control jacket-side opening 41a is provided in the temperature control jacket attachment part 41 of the joining member 40. A temperature-controlled member-side opening 42a is provided in the temperature-controlled member attachment part 42 of the joining member 40. Relative positions of the temperature control jackets 3a, 3b, and 3c with respect to the joining member 40, and relative positions of the barrel 1 and the nozzle 2 with respect to the joining member 40 can be changed.

Figure 5:
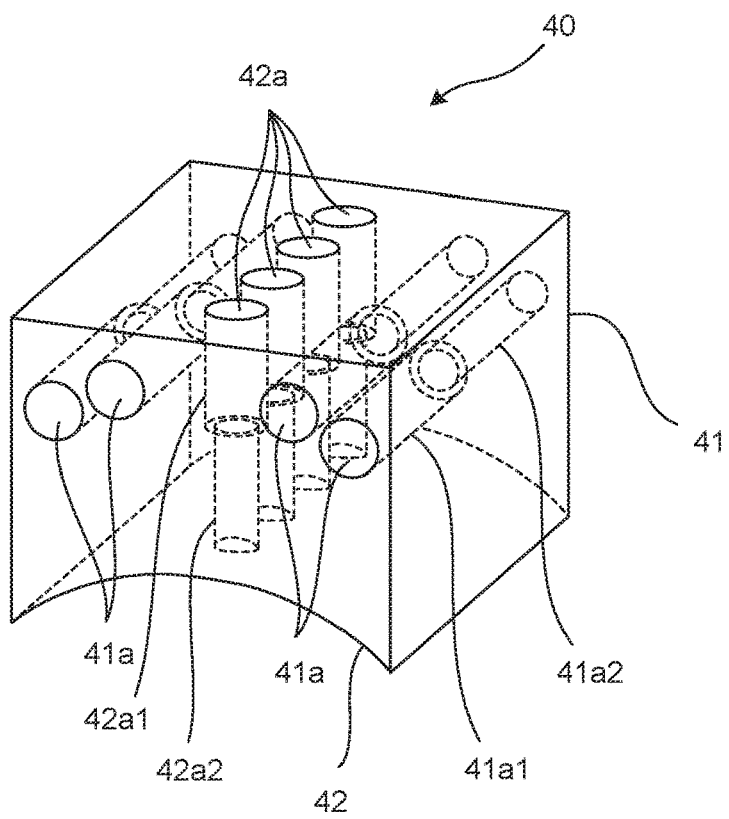
FIG. 5 is a perspective view of a joining member in another embodiment of the present invention.

The temperature control jacket-side opening 41a provided in the temperature control jacket attachment part 41 is formed of four round holes which are placed in a curved fashion (or, formed of a round-hole row which includes four round holes and is curved) so as to fit in with a peripheral surface of each of the barrel 1 and the nozzle 2 in plan view, as shown in FIG. 5. Accordingly, relative positions of the temperature control jackets 3a, 3b, and 3c with respect to the joining member 40 can be changed in a direction in which a peripheral surface of each of the barrel 1 and the nozzle 2 is curved.

On the other hand, the temperature-controlled member-side opening 42a provided in the temperature-controlled member attachment part 42 is formed of four round holes which are aligned (or, formed of a round-hole row which includes four round holes and extends) along an axis of each of the barrel 1 and the nozzle 2. Accordingly, relative positions of the barrel 1 and the nozzle 2 with respect to the joining member 40 can be changed along an axis of each of the barrel 1 and the nozzle 2.

As shown in FIG. 5, counter boring parts 41a1 and 42a1 into which heads of the bolts 51a and 52a which are fixing members are insertable, and insertion parts 41a2 and 42a2 into which bodies of the bolts 51a and 52a are insertable, are formed in the temperature control jacket-side opening 41a and the temperature-controlled member-side opening 42a of the joining member 40. As a result of provision of the counter boring parts 41a1 and 42a1, a bolt length of each of the bolts 51a and 52a can be shortened.

It is noted that also each of those round holes, as described above regarding the opening h in the first embodiment, may be provided so as to have a size enough to allow change in relative positions of the temperature control jackets 3a, 3b, and 3c with respect to the joining member 40 within a limit allowing the bolt 51a or 52a to be tightened up. Also, the number of round holes is not limited to any number.

An example of effect produced by the present invention in temperature control is as follows.

Generally, a temperature is set so as to increase from a base end side of a barrel toward a leading end side of a nozzle, and each temperature control jacket is individually controlled so that the foregoing temperature gradient is secured. However, in a case where a required temperature gradient cannot be sufficiently secured only by such control as stated above, it is possible to precisely secure a temperature gradient by finely adjusting a position where each of temperature control jackets is attached, in some cases. The present invention is also adaptable to such a case.

Thus, as described above, the present invention can provide an injection molding machine which allows change in a position and a phase of a temperature control jacket while having a simple structure being advantageous in terms of a manufacturing cost. Also, the present invention can provide an injection molding machine which allows alignment with a temperature sensor, to thereby achieve more precise temperature control of a molding material. Further, the present invention can provide an injection molding machine which is also adaptable to temperature control jackets which are different in size.

The present invention is not limited to the above-described embodiments. Also, each of technical matters in any of embodiments can be applied to a different embodiment, and such can be regarded as an embodiment.

For example, a slot, a notch, and a round hole are applicable to an opening in every joining member, and a combination of a slot, a notch, and a round hole can be applied to an attachment part of a temperature control jacket or a temperature-controlled member. Also a shape of an opening of a joining member is not limited to a shape shown in the drawings, such as a slot, a notch, and a round hole.

Further, as a fixing member which is inserted into an opening, not only a bolt shown in the above-described embodiments, but also a full-threaded bolt or a stud bolt which is screwed into and engaged with a tap provided in a temperature-controlled member, to be attached to the tap, can be used. In this case, a full-threaded bolt or a stud bolt is inserted into an opening of a joining member, and is tightened up by a nut.

The invention claimed is:

1. An injection molding machine comprising:
   a temperature-controlled member;
   a temperature control jacket that includes a flow channel or a cooling element and is removably placed on a peripheral surface of the temperature-controlled member; and
   a joining member configured to join the temperature-controlled member and the temperature control jacket, wherein
   the joining member includes:
      a temperature control jacket attachment part attached to the temperature control jacket; and
      a temperature-controlled member attachment part attached to the temperature-controlled member,
   the temperature control jacket attachment part includes a plurality of first openings into which a plurality of first fixing members is insertable in order to join the joining member and the temperature control jacket,
   the temperature-controlled member attachment part includes a plurality of second openings into which a plurality of second fixing members is insertable in order to join the joining member and the temperature-controlled member,
   at least one of the plurality of first and second openings is configured to allow change in a position where the corresponding first or second fixing member is inserted in the opening,
   the joining member comprises a block body having a first face and a second face, perpendicular to the first face, wherein the temperature control jacket attachment part is on the first face, and the temperature-controlled member attachment part is on the second face,
   the plurality of first openings is in the first face of the block body, wherein the plurality of first openings extends parallel with each other,
   the plurality of second openings is in the second face of the block body, wherein the plurality of second openings extends parallel with each other, the temperature-controlled member attachment part has a curved surface that is curved along the peripheral surface of the temperature-controlled member, the plurality of first openings is arranged along a curvature corresponding to the curved surface of the temperature-controlled member attachment part, the plurality of second openings is aligned along an axis of the temperature-controlled member, the plurality of first openings includes a first group of first openings and a second group of first openings, and the plurality of the second openings is positioned between the first group of first openings and the second group of first openings, and at a top of the curvature along which the plurality of first openings is arranged.

2. The injection molding machine according to claim 1, further comprising a temperature sensor in the temperature-controlled member, wherein positions of the temperature control jacket and the temperature sensor are changeable by change in a position where the corresponding first or second fixing member is inserted in said at least one of the plurality of first and second openings.

3. The injection molding machine according to claim 1, wherein said at least one of the plurality of first and second openings is formed of at least one of a slot, a notch, and a round hole.

4. The injection molding machine according to claim 1, wherein said at least one of the plurality of first and second openings is configured to allow change in a position of the temperature control jacket relative to the temperature-controlled member by changing the position where the corresponding first or second fixing member is inserted and fixed in the opening.

5. The injection molding machine according to claim 1, wherein the molding machine comprises a plurality of the joining members.

* * * * *